United States Patent Office 3,362,960
Patented Jan. 9, 1968

3,362,960
O-QUINOLYL-(8)-N-METHYL CARBAMIC ACID ESTERS
Ernst Hodel, Basel, Switzerland, assignor to Geigy Chemical Corporation, Greenburgh, N.Y., a corporation of Delaware
No Drawing. Continuation of application Ser. No. 457,808, May 21, 1965. This application Apr. 24, 1967, Ser. No. 633,304
Claims priority, application Switzerland, June 4, 1964, 7,290/64
9 Claims. (Cl. 260—287)

This is a continuation of copending application Ser. No. 457,808, filed May 21, 1965, now abandoned.

The present invention concerns new heterocyclic carbamic acid esters and the salts thereof, particularly quinolyl-(8)-carbamic acid esters, processes for the production thereof as well as fungicidal agents which contain these new compounds and/or their salts as active ingredients, also processes for combatting phytopathogenic fungi using the new compounds and/or the salts thereof as active ingredients or using agents which contain them as active ingredients, as well as processes for the production of such fungicidal agents.

It has been found that, due to their excellent fungicidal activity, heterocyclic carbamic acid esters of the formula

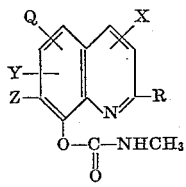

(I)

wherein
R and X each represent hydrogen or a lower aliphatic hydrocarbon radical,
Y represents a monovalent substituent as defined below, and
each of Q and Z represents hydrogen, an optionally substituted aliphatic radical as defined below, or halogen, and are suitable for the combatting of fungi, in particular for the combatting of photopathogenic fungi.

In contrast thereto, known quinonyl N-methyl carbamic acid ester possesses no practically useful fungicidal activity.

"Lower" used herein in connection with an aliphatic radical means that such radical has from 1 to 4 carbon atoms, unless expressly stated otherwise.

The new heterocyclic carbamic acid esters of Formula I are produced according to the invention by reacting a compound of the formula

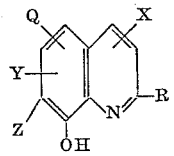

(II)

wherein R, Q, X, Y and Z have the meaning given above, with an N-methyl carbamic acid halide, particularly with N-methyl carbamic acid chloride.

The reaction is optionally performed in the presence of a solvent which is inert to the reaction partners such as an aromatic hydrocarbon, e.g. benzene, toluene, xylene, an aliphatic or aromatic chlorinated hydrocarbon, as ester, ketone or amide and it is performed advantageously in the presence of a proton acceptor such as an organic base, e.g. a tertiary amine such as pyridine or trialkylamine, an inorganic base, e.g. an alkyli or alkaline earth metal hydroxide. The reaction temperatures range from 10–100° C. Instead of the preferred N-methyl carbamic acid chloride, also N-methyl carbamic acid bromide can be reacted with the starting materials of Formula II.

The new carbamic acid esters of Formula I are also obtained by a modified process by reacting the starting materials of Formula II with methyl isocyanate instead of with an N-methyl carbamic acid halide.

Another variation of the invention consists in the use of a mixture of methyl isocyanate and N-methyl carbamic acid chloride instead of methyl isocyanate in the process described immediately above.

The new heterocyclic carbamic acid esters of Formula I can also be obtained by reacting a compound of Formula II with phosgene and methylamine, or by treating these starting materials with chloroformic acid ethyl ester and then reacting the product obtained with methylamine. The reactions described in all these modifications of the process are also performed advantageously in the presence of solvents which are inert to the reaction components and a proton acceptor. Aromatic hydrocarbons such as benzene, toluene, xylene, etc. and also chlorinated hydrocarbons such as chloroform, chlorobenzene, also amides such as dimethyl formamide, or ketones can be used as solvents. Suitable proton acceptors are the inorganic bases such as the hydroxides of alkali and alkaline earth metals and organic nitrogen bases, e.g. tertiary amines such as triethylamine and pyridine.

If desired, the carbamic acid esters of Formula I produced by the process and variations thereof described above, can be converted into their salts, especially their non-phytotoxic salts, by reaction with organic or inorganic acids, e.g. with hydrochloric acid, sulfuric acid, nitric acid, acetic acid, propionic acid, benzoic acid, phthalic acid, oxalic acid, succinic acid or citric acid.

Starting compounds of Formula II are known or can be readily produced in an analogous manner as the known compounds, by known methods.

The new carbamic acid esters of Formula I are stable in water and dissolve well in the usual organic solvents.

By lower aliphatic hydrocarbon radicals symbolized by R and X in Formula I are meant alkyl and alkenyl radicals having 1 to 6 carbon atoms, preferably those having 1–4 carbon atoms such as the methyl and ethyl radical, the propyl and butyl radicals, the allyl and methally radical, the butenyl radicals. As optionally substituted aliphatic radicals—symbolized by Q or Z—are meant the alkyl and alkenyl radicals listed for R and X which can be substituted by one or more halogen atoms such as fluorine, chlorine or bromine, by the hydroxyl or amino group, the phenyl, a halogenophenyl or nitrophenyl radical.

Examples of monovalent substituents, symbolized by Y in Formula I, are: hydrogen, alkyl and alkenyl radicals having 1–5 carbon atoms; aryl radicals, e.g. the phenyl, nitrophenyl and halogenophenyl radicals; aralkyl radicals such as the benzyl radical; alkoxy, alkylthio, alkenyloxy and alkenylthio radicals the hydrocarbon moiety of which contains 1 to 5 carbon atoms; aliphatic and aromatic acyl radicals, namely alkanoyl of maximally 18 carbon atoms, such as the acetyl, propionyl, butyryl, valeryl, lauroyl, stearoyl radical, etc., as well as the benzoyl and phenacyl radicals and derivatives thereof substituted by halogen, the nitro, alkyl or alkoxy groups; halogen atoms such as fluorine, chlorine, bromine, iodine; halogenoalkyl radicals such as the trifluoromethyl radical; the amino group; an alkylamino, dialkylamino or acylamino group; the cyano or thiocyano group, the nitro group, the sulfinyl, sulfonyl, or sulfamyl radical and also an alkylsulfonamido radical.

The aliphatic hydrocarbon radicals represented by R and X can be identical or different.

The new active ingredients of Formula I have excellent activity against numerous phytopathogenic fungi and are used in the form of fungicides for the protection of plants and parts thereof by which is meant blossom, seeds, fruit, roots, stalks and foliage. Because of their properties, the new active substances are both protective fungicides and also systemic fungicides. Plants treated with the active substances according to the invention are given an additional and more long lasting protection from attack by fungi. For the treatment and protection of seeds, the compounds of Formula I—made up into so-called seed dressings—have good activity particularly in the case of attack by *Tilletia tritici* and *Fusarium culmorum*.

There is no inhibition of germination of the seeds treated. The new carbamic acid esters have no phytotoxic effects on plants in the normal concentrations for application, which vary between 0.01 and 2% (calculated on the active substance). In addition to the excellent fungicidal activity, the compounds of Formula I also have fungistatic properties so that they can be used for the combatting of fungi on materials of all types either alone or combined with other substances suitable for the protection of material. In addition, the new carbamic acid esters can be used for combatting certain pests as has been shown, for instance, in tests on ixodes (*Rhipocephalus bursa* and *Boophilus microplus*).

Particularly satisfactory fungicidal action is shown by the compounds falling under Formula I in which R represents hydrogen or methyl,
X represents hydrogen or lower alkyl,
Y represents hydrogen, lower alkyl, lower alkoxy, alkanoyl of from 2 to 12 carbon atoms, benzoyl, chlorobenzoyl, bromobenzoyl, chlorine, bromine, flourine, iodine, nitro, thiocyano, cyano or amino,
Z represents hydrogen, chlorine, bromine, fluorine, iodine, lower alkyl, alkenyl of from 3 to 4 carbon atoms, benzyl, chlorobenzyl or bromobenzyl, and
Q represents hydrogen, chlorine or bromine.

The following non-limitative examples serve to illustrate the invention. Where not otherwise stated, parts and percentages are given therein as by weight and the temperatures are in degrees centigrade.

*Example 1*

31.8 parts of 2-methyl-8-hydroxyquinoline are dissolved in 150 parts by volume of dimethyl formamide and 40 parts of pyridine (anhydrous). A solution of 40 parts of N-methyl carbamic acid chloride in 60 parts of dimethyl formamide are added dropwise at a temperature of 10–15° while cooling well, the addition being made within 20 minutes. The reaction mixture is then stirred for 6 hours at room temperature. The temperature is then raised to 50–55° and the mixture is stirred for 15 hours at this temperature. To determine whether the reaction has been completed, a sample is taken from the reaction mixture, diluted with ethanol and a few drops of very dilute aqueous solution of ferric chloride are added. If the reaction is complete, the colour should only be a pale green. The reaction mixture is cooled and poured into ice water while stirring. A precipitate is formed which is filtered under suction and washed with ice water. The crude product is dried in vacuo at room temperature. After recrystallisation from benzene, the O-[2-methyl-quinolyl-(8)]-N-methyl carbamic acid ester obtained melts at 136–138° (with decomposition). The yield is 56% of the theoretical.

*Example 2*

191 parts of 2-methyl-8-hydroxyquinoline are dissolved in 800 parts by volume of dimethyl formamide and 300 parts of anhydrous triethylamine. A solution of 190 parts of methyl carbamic acid chloride and 50 parts of methyl isocyanate in 200 parts of dimethyl formamide is added dropwise to this solution within 30 minutes. The mixture is then stirred for 2 hours at room temperature. The completion of the reaction is determined with iron-III chloride as described in Example 1. The reaction mixture is then slowly poured into ice water while stirring well. The precipitate formed is filtered off under suction and washed with ice water. Recrystallised from benzene, the O-[2-methylquinolyl-(8)]-N-methyl carbamic acid ester so obtained melts at 136–138° (with decomposition). The yield is 62% of the theoretical.

*Example 3*

100 parts of N-methyl carbamic acid chloride dissolved in 100 parts by volume of dimethyl formamide, are added dropwise within about half an hour to a suspension of 151.5 parts of 5,7-dibromo-8-hydroxyquinoline in 500 parts by volume of dimethyl formamide and 100 parts of anhydrous pyridine, the addition being made while stirring at 10–15°. The mixture is stirred for 6 hours at room temperature and then for another 15 hours at 40–50°, whereupon a brown liquid is obtained. The end of the reaction is determined as described in Example 1 with a solution of ferric chloride. The clear reaction mixture, after cooling, is poured in 6000 parts of water while stirring. After 3 hours, the reaction product which precipitates is filtered off under suction, washed with water, quickly dried in vacuo over a drying agent and recrystallised from abs. benzene. The O-[5,7-dibromoquinolyl-(8)]-N-methyl carbamic acid ester is obtained in the form of colourless needles which melt at 202–203°. The yield is 82.2% of the theoretical.

*Example 4*

21.5 parts of 5-n-butyryl-8-hydroxyquinoline are dissolved in 100 parts by volume of dimethyl formamide. After adding 20 parts of anhydrous pyridine, 20 parts of methyl carbamic acid chloride dissolved in 50 parts by volume of dimethyl formamide are added dropwise within 10 minutes at 10–15° while stirring. The mixture is stirred for 24 hours at room temperature and the end of the reaction is determined as described in Example 1. The brown reaction liquid is poured into 1500 parts of ice water and stirred for 2 hours in order to decompose the excess methyl carbamic acid chloride. The solid reaction product which precipitates is filtered off under suction, washed with water and dried. After recrystallisation from benzene/petroleum ether, the O-[5-n-butyryl-quinolyl-(8)]-N-methyl carbamic acid ester obtained melts at 105–107°. The yield is 62.5% of the theoretical.

The compounds given in the following table are also obtained by the methods described in the above examples on using the corresponding 8-hydroxyquinoline derivatives:

| Ex. No. | Compound | M.P., °C. | Yield, Percent |
|---|---|---|---|
| 5 | O-[5-methyl-quinolyl-(8)]-N-methyl carbamic acid ester. | 148–149 | 66.6 |
| 6 | O-[2,5-dimethyl-quinolyl-(8)]-N-methyl carbamic acid ester. | 146–147 | 52.1 |
| 7 | O-[5-ethyl-quinolyl-(8)]-N-methyl carbamic acid ester. | 123–126 | 86.9 |
| 8 | O-[3-methyl-quinolyl-(8)]-N-methyl carbamic acid ester. | 143–144 | 55.0 |
| 9 | O-[3-ethyl-quinolyl-(8)]-N-methyl carbamic acid ester. | 125–127 | 43.4 |
| 10 | O-[2-methyl-5-ethyl-quinolyl-(8)]-N-methyl carbamic acid ester. | 139–141 | 53.2 |
| 11 | O-[5-acetyl-quinolyl-(8)]-N-methyl carbamic acid ester. | 119–121 | 43.0 |
| 12 | O-[5-isovaleryl-quinolyl-(8)]-N-methyl carbamic acid ester. | 104–105 | 59.4 |
| 13 | O-[5-benzoyl-quinolyl-(8)]-N-methyl carbamic acid ester. | 128–129 | 60.7 |
| 14 | O-[5-(2'-chlorobenzoyl)-quinolyl-(8)]-N-methyl carbamic acid ester. | 113–115 | 48.9 |
| 15 | O-[5-(4'-chlorobenzoyl)-quinolyl-(8)]-N-methyl carbamic acid ester. | 216–217 | 44.6 |
| 16 | O-[5-(2'-bromobenzoyl)-quinolyl-(8)]-N-methyl-carbamic acid ester. | 116–118 | 31.6 |
| 17 | O-[5-(4'-bromobenzoyl)-quinolyl-(8)]-N-methyl-carbamic acid ester. | 213–215 | 47.2 |
| 18 | O-[5-(2',4'-dichlorobenzoyl)-quinolyl-(8)]-N-methyl carbamic acid ester. | [1] 125 | 42.5 |
| 19 | O-[2-methyl-5-acetyl-quinolyl-(8)]-N-methyl carbamic acid ester. | 129–131 | 50.3 |
| 20 | O-[2-methyl-5-isovaleryl-quinolyl-(8)]-N-methyl carbamic acid ester. | 108–109 | 36.6 |
| 21 | O-[2-methyl-5-lauroyl-quinolyl-(8)]-N-methyl carbamic acid ester. | 87–90 | 36.1 |
| 22 | O-[2-methyl-5-benzoyl-quinolyl-(8)]-N-methyl carbamic acid ester. | 152–154 | 33.4 |
| 23 | O-[2-methyl-5-(4'-chlorobenzoyl)-quinolyl-(8)]-N-methyl carbamic acid ester. | 134–135 | 23.3 |
| 24 | O-[5-chloroquinolyl-(8)]-N-methyl carbamic acid ester. | 142–144 | 73.5 |
| 25 | O-[5,7-dichloroquinolyl-(8)]-N-methyl carbamic acid ester. | 180–181 | 79.3 |
| 26 | O-[5-chloro-7-iodoquinolyl-(8)]-N-methyl carbamic acid ester. | 149–150 | 60.7 |
| 27 | O-[5,7-diiodoquinolyl-(8)]-N-methyl carbamic acid ester. | 215–217 | 61.6 |
| 28 | O-[2-methyl-6-chloroquinolyl-(8)]-N-methyl carbamic acid ester. | 130–133 | 65.2 |
| 29 | O-[2,7-dimethyl-5-chloroquinolyl-(8)]-N-methyl carbamic acid ester. | 154–156 | 63.3 |
| 30 | O-[4-methyl-5-chloroquinolyl-(8)]-N-methyl carbamic acid ester. | 154–156 | 55.9 |
| 31 | O-[2-methyl-5-chloroquinolyl-(8)]-N-methyl carbamic acid ester. | 137–139 | 58.5 |
| 32 | O-[2-methyl-5,7-dichloroquinolyl-(8)]-N-methyl carbamic acid ester. | 150–151 | 56.1 |
| 33 | O-[2-methyl-5,7-dibromoquinolyl-(8)]-N-methyl carbamic acid ester. | 147–149 | 73.5 |
| 34 | O-[6-nitro-quinolyl-(8)]-N-methyl carbamic acid ester. | 192–194 | 58.6 |
| 35 | O-[2-methyl-6-nitroquinolyl-(8)]-N-methyl carbamic acid ester. | 141–142 | 49.8 |
| 36 | O-[5-thiocyano-quinolyl-(8)]-N-methyl carbamic acid ester. | 135–137 | 40.5 |
| 37 | O-[5-chloro-7-fluoro-quinolyl-(8)]-N-methyl carbamic acid ester. | | |
| 38 | O-[5-fluoro-quinolyl-(8)]-N-methyl carbamic acid ester. | | |
| 39 | O-[5-cyano-quinolyl-(8)]-N-methyl carbamic acid ester. | | |
| 40 | O-[6-amino-quinolyl-(8)]-N-methyl carbamic acid ester. | | |

[1] With decomposition.

Example 41

5.2 parts of 2,6-dimethyl-8-hydroxyquinoline are dissolved in 30 parts by volume of dimethyl formamide while stirring, 7.5 parts of anhydrous triethylamine are added and, while cooling well at 10–15°, a solution of 4.5 parts of methyl carbamic acid chloride and 1.5 parts of methyl isocyanate in 15 parts by volume of dimethyl formamide is added dropwise within 15 minutes. The reaction is complete after stirring for 6 hours at room temperature. The completion of the reaction is determined again by the colour reaction with ferric chloride solution as described in Example 1. The yellow liquid is poured into 500 parts of water while stirring. After 1½ hours, the solid reaction product is filtered off under suction, washed with water and then dried in vacuo. On recrystallising from abs. benzene, O - [2,6 - dimethyl-quinolyl-(8)]-N-methylcarbamic acid ester is obtained which melts at 140–142°. The yield is 60.8% of the theoretical.

The compounds given in the following table are also obtained by the method described in Example 41.

| Ex. No. | Compound | M.P., °C. | Yield, Percent |
|---|---|---|---|
| 42 | O-[4-methyl-quinolyl-(8)]-N-methyl carbamic acid ester. | 149–151 | 57.8 |
| 43 | O-[6-methyl-quinolyl-(8)]-N-methyl carbamic acid ester. | 142–144 | 60.1 |
| 44 | O-[2-methyl-7-allyl-quinolyl-(8)]-N-methyl carbamic acid ester. | 134–136 | 42.9 |
| 45 | O-[6-chloroquinolyl-(8)]-N-methyl carbamic acid ester. | 136–139 | 58.1 |
| 46 | O-[3-methyl-5-chloroquinolyl-(8)]-N-methyl carbamic acid ester. | 160–161 | 61.2 |
| 47 | O-[5-chloro-7-methyl-quinolyl-(8)]-N-methyl carbamic acid ester. | 144–145 | 60.4 |
| 48 | O-[5,7-dichloro-6-methyl-quinolyl-(8)]-N-methyl carbamic acid ester. | 172–173 | 24.5 |
| 49 | O-[2,6-dimethyl-5,7-dichloroquinolyl-(8)]-N-methyl carbamic acid ester. | 157–158 | 64.6 |
| 50 | O-[2-methyl-5,6,7-trichloroquinolyl-(8)]-N-methyl carbamic acid ester. | 152–154 | 63.8 |
| 51 | O-[2-methyl-5-methoxy-quinolyl-(8)]-N-methyl carbamic acid ester. | | |
| 52 | O-[2,6-dimethyl-7-ethyl-quinolyl-(8)]-N-methyl carbamic acid ester. | | |
| 53 | O-[7-benzyl-quinolyl-(8)]-N-methyl carbamic acid ester. | | |
| 54 | O-[7-(4'-chlorobenzyl)-quinolyl-(8)]-N-methyl carbamic acid ester. | | |
| 55 | O-[7-(2'-bromobenzoyl)-quinolyl-(8)]-N-methyl carbamic acid ester. | | |

Example 56

150 parts of 2-methyl-8-hydroxyquinoline are dissolved in 1500 parts of benzene, and a solution of 57 parts of methyl isocyanate and 15 parts of triethyl amine is added dropwise to this solution. The mixture is allowed to stand for 16 hours at 20 to 24°. Completion of the reaction is determined in the manner described in Example 1 by means of a solution of ferric chloride. The separated O-[2-methyl-quinolyl-(8)]-carbamic acid ester having a melting point of 136 to 137° (decomposition) is sucked off and washed with a small quantity of cold benzene. By recrystallization from absolute benzene a product of melting point 137 to 138° (decomposition) is obtained. The yield is 65% theoretical.

The fungicidal agents are produced by methods known per se by thoroughly mixing and milling the active substances of general Formula I with suitable carriers optionally with the addition of adhesives, dispersing agents or solvents which are inert to the active substances. These agents can be used in the following forms:

Solid forms: Dusts, sprinkling agents, granulates (coated granules, impregnated granules, homogeneous granules);
Water dispersible concentrates of active substances: wettable powders, pastes, emulsions;
Liquid forms: solutions; and
Forms for the production of aerosols, fogs and fumigants.

To produce the solid forms for use (dusts and sprinkling agents, granulates), the active substances are brought on to solid carriers such as talcum, kaolin, bole, loess, chalk, ground limestone, limestone, attaclay, dolomite, diatomaceous earth, precipitated silicic acid, alkaline earth silicates, sodium and potassium aluminium silicates (feldspar and mica), calcium and magnesium sulphates, magnesium oxide, milled plastics, fertilizers such as ammonium sulphate, ammonium phosphates, ammonium nitrate, urea, etc., and also ground vegetable products such as bark dust, sawdust, ground nutshells, bran, cellulose powder, residues of plant extractions, active charcoal, etc. These carriers can be used alone or admixed with each other.

The particle size of the carriers is, for dusts up to about 100μ, for sprinkling agents from about 75μ–0.2 mm., and for granulates from 0.2 mm.–1 mm. (and coarser).

As a general rule, the concentration of active substances in the solid preparations is from 0.5–80%.

To these mixtures of active ingredient and carriers can also be added additives which stabilise the active substance and/or non-ionic, anionic and cationic surface active substances which, for example, improve the adhesion of the active substances on plants and plant parts (glues, adhesives) and/or attain better wettability (wetting agents) and dispersibility of the active substances. Examples of such surface active substances are as follows: olein plus hydrate of lime, cellulose derivatives of a medium degree of viscosity (methyl celluloses, carboxymethyl celluloses, hydroxyethyl celluloses), galactomans (guar gum), their anionic and cationic derivatives, polyethylene glycol ethers of mono- and di-alkyl phenols (having 5–15 ethyleneoxide radicals per molecule and 8–9 carbon atoms in the alkyl radical, e.g. the commercial products known under the names "Triton," "Ipegal," "Terpitol," etc.), condensation products of ethylene oxide/ propylene oxide (medium molecular weight of the polyoxypropylene part: 1750; e.g. the commercial products known by the name "Pluronics"), solid, liquid sulphite waste liquor, alkali metal and alkaline earth metal salts thereof, mineral oils and polyethylene glycol ethers (carbowaxes), fatty alcohol polyethylene glycol ethers (having 5–20 ethylene oxide radicals per molecule and 8–18 carbon atoms in the fatty alcohol moiety; e.g. the commercial products known by the name "Genapol"), dextrins, caseins, their calcium salt, proteins, polyvinyl pyrrolidones, polyvinyl alcohols (e.g. the commercial product known as "Moviol"), condensation products of ureaformaldehyde and also latex products.

In some cases it is necessary to add to these forms for application, plant, animal and mineral oils as penetrating agents, i.e. agents which help and improve the penetration of the active substance into the plants and parts thereof.

The concentrates of active substance which can be dispersed in water: wettable powders, pastes and emulsion concentrates, are agents which can be diluted with water to any concentration desired for application to plants and parts thereof. They consist of active substance, carrier, additives which stabilise the active substance, surface active substances, protective colloids and anti-foam agents and, optionally, solvents. The concentration of active substance in these agents is 5–80%.

Wettable powders and pastes are obtained by mixing and milling the active substances with surface active substances and pulverulent carriers in suitable mixers and milling machines until homogeneity is attained. Carriers are, for example, those mentioned in the paragraph dealing with solid forms for application. In some cases it is advantageous to use mixtures of carriers. By surface active substances, glues or adhesives, wetting and dispersing agents and protective colloids are to be understood. Of the glues and adhesives already mentioned, because of their properties a number thereof can be used as so-called auxiliary dispersing agents. Other dispersing agents and wetting agents which can be used are:

Condensation products of sulphonated naphthalene and naphthalene derivatives with formaldehyde (e.g. the commercial product "Sellasol"), condensation products of naphthalene and derivatives thereof with phenol and formaldehyde (the commercial products known as "Irgatan"), also aluminium salts of lignin sulphonic acids, further alkylaryl sulphonates, alkali metal salts and alkaline earth metal salts of dibutyl naphthalene sulphonic acid, fatty alcohol sulphates such as salts of sulphated hexadecanols, heptadecanols, octadecanols, octadecenols, the sodium salt of sulphated hexadecyl glycol ethers (the commercial products known as "Eriopon"), the sodium salt of oleyl methyl tauride (the commercial products known as "Arkopon"), ditertiary acetylene glycols (the commercial products known as "Surfynol"), dialkyldilauryl ammonium chloride (the commercial product known as "Aliquat"), and fatty acid alkali metal and alkaline earth metal salts. Examples of anti-foam agents are: silicones, Antifoam A, etc.

The active substances are so mixed, milled, sieved and strained with the additives mentioned above that the solid particle size in wettable powders is 20–40µ and in pastes is not more than 3µ. To produce emulsion concentrates and pastes, liquid dispersing agents such as those given in the previous paragraphs, organic solvents and water are used. Examples of solvents are: alcohols, benzene, xylenes, toluene, dimethyl sulphoxide, dimethyl formamide and mineral oil fractions boiling between 120 and 350° C. The solvents must be almost without smell, not phytotoxic, inert to the active substances and not easily inflammable.

The forms for application which can be dispersed in water can also contain other additives to increase the stability to light, also penetrating agents, anti-foam agents and also synergists.

The wettable powders, pastes and emulsion concentrates are diluted with water to the practical concentrations desired which are between 0.01 and 2%, calculated on the active substance. In the composition and concentration for use described, these application forms have good suspendibility which can be further improved, e.g. by addition of synthetic voluminous silicic acid. The emulsifiable property of the emulsion concentrates is also very good.

In addition, the agents according to the invention can be in the form of solutions or sprays. For this purpose the active substances of general Formula I can be dissolved in suitable organic solvents, mixtures of solvents or in water. In particular, higher aliphatic and aromatic hydrocarbons, chlorinated derivatives thereof, alkyl naphthalenes alone or mixed with each other or with water can be used as organic solvents. The solutions preferably contain the active substances in a concentration from 1 to 20%. They are used in the form of spray or mist with suitable spraying or mist blowing equipment.

So-called aerosols can be produced from solutions of the active substances by the addition of propellants; aerosols are particularly suitable for use in the house and garden. Both the solutions and the aerosols can contain additives to increase the adhesion, resistance to rain and light and also vegetable, animal and mineral oils to improve the adhesion and penetration.

Also, the active substances of general Formula I can be worked up with a combustible substance, e.g. sawdust or paper and a source of oxygen such as potassium chlorate and potassium nitrate, to form a fumigant or fumigant paper.

The application forms described can be mixed very well with other biocidally active compounds or agents. Thus to broaden the range of action in the agents according to the present invention, other biocidally active substances such as insecticides, fungicides, bactericides, fungistatics, bacteriostatics or nematicides can be present. The agents according to the invention can also contain fertilizers, plant hormones, etc.

To increase the stability of the active substances it is of advantage to add, either by mixing in, by diluting or by dispersing, additives which regulate the pH value of the preparations which are to be diluted with water or contain water as solvent.

The following examples describe the production of various forms for application of the fungicidal agents according to the invention. Parts are given therein as parts by weight.

EXAMPLE I

*Dust*

(a)

| | Parts |
|---|---|
| O - [5 - methyl-quinolyl-(8)]-N-methyl-carbamic acid ester | 10 |
| Highly dispersed silicic acid | 5 |
| Talcum | 85 | are mixed together and milled. This 10% dust is used for the disinfection of seed beds.

(b)

| | Parts |
|---|---|
| O - [5 - ethyl-quinolyl-(8)]-N-methyl-carbamic acid ester | 2 |
| Talcum | 98 | are intimately mixed together and milled. A 2% dust is obtained which is used for the treatment of seed beds.

EXAMPLE II

Granulates

| | Parts |
|---|---|
| O - [5 - acetyl-quinolyl-(8)]-N-methyl-carbamic acid ester | 5 |
| Highly dispersed silicic acid | 3 |
| Ground limestone (particle size 0.4–0.8 mm.) | 87 |
| Carbowax | 5 |

The ground limestone is evenly impregnated with the carbowax. These particles are then mixed with the mixture consisting of the active substance and highly dispersed silicic acid, and milled.

EXAMPLE III

Seed dressing (a)

| | Parts |
|---|---|
| O - [5-benzoyl-quinolyl-(8)]-N-methyl-carbamic acid ester | 10 |
| Kieselguhr | 5 |
| Liquid paraffin | 1 |
| Talcum | 84 |

(b)

| | Parts |
|---|---|
| O - [5 - (2',5 - dibromobenzoyl - quinolyl - (8)]-N-methyl-carbamic acid ester | 60 |
| Kieselguhr | 15 |
| Liquid paraffin | 1 |
| Talcum | 24 |

The active substance is mixed in a mixing apparatus with the carriers and the paraffin as distributing agent.

The pulverulent dressing agent obtained is then milled and used for the treatment of seeds of all types.

EXAMPLE IV

Wettable powder (a)

| | Parts |
|---|---|
| O - [5,7 - dichloro - quinolyl - (8)] - N - methyl - carbamic acid ester | 50 |
| Cetyl polyglycol ether | 5 |
| Naphthalene sulphonic acid/formaldehyde condensation product | 5 |
| Highly dispersed silicic acid | 5 |
| Adhesive | 1 |
| Kaolin | 34 |

(b)

| | Parts |
|---|---|
| O - [4 - methyl - quinolyl - (8)] - N - methyl-carbamic acid ester | 65 |
| Sodium salt of fatty alcohol sulphates ("Tesapon") | 2.5 |
| Cetyl polyglycol ether | 2.5 |
| Sulphite waste liquor—sodium salt | 8 |
| Adhesive mixture (1 part of hydroxyethyl cellulose +1 part of Champagne chalk) | 2 |
| Kieselguhr | 10 |
| Kaolin | 10 |

The active substances are finely mixed with the carriers and distributing agents given for each and milled. A 50% or a 65% wettable powder respectively is obtained, the wettability and suspendability of which are excellent.

On diluting these wettable powders with water, suspensions are produced which are suitable for the treatment of fruit trees.

EXAMPLE V

Pastes

| | Parts |
|---|---|
| O - [6 - nitroquinolyl - (8)] - N - methyl - carbamic acid ester | 50 |
| Nonylphenol/ethyleneoxide condensation product having 8 to 10 ethyleneoxide groups | 14 |
| Spindle oil | 3.5 |
| Soap powder | 0.5 |
| Water | 32 |

The active substance is intimately mixed with the additives in a mixing apparatus. This mixture is then milled on a roller mill. A 50% paste is obtained which, before use as fungicide, can be diluted with water to any concentration desired.

EXAMPLE VI

Emulsion concentrate

| | Parts |
|---|---|
| O - [5 - methyl - quinolyl - (8)] - N - methyl - carbamic acid ester | 10 |
| Xylene | 55 |
| Dimethyl formamide | 32 |
| Mixture of emulsifying agents: alkylaryl polyethyleneglycol-alkylaryl sulphonate-potassium salt | 3 |

The active ingredient is dissolved in a mixture of xylene and dimethyl formamide. The mixture of emulsifying agents is then added to this solution. An emulsifiable solution is obtained which can be diulted with water to form emulsions of any concentration desired.

Phytofungicidal test

A. SPORE GERMINATION TEST

The fungicidal activity of the active ingredients of the general Formula I was determined by a spore germination test with spores of the following types of fungi:

| | |
|---|---|
| *Alternaria tenuis* | *Fusarium culmorum* |
| *Botrytis cinerea* | *Mucor spec.* |
| *Clasterosporium c.* | *Penicillium spec.* |
| *Coniothyrium dipl.* | *Stemphylium cons.* |

A determined amount of a 1%, 0.1% and 0.01% acetone solution of the active ingredient is placed on 2 glass slides of exactly the same size, under the same conditions. The solvent is evaporated off and a uniform coating of active ingredient which can be inoculated is obtained on the glass slides. The slides inoculated with fungi spores are then kept in dishes at room temperature in an atmosphere which is almost saturated with steam. After 2–3 and 4–6 days, the germinated spores are counted.

The concentrations of active ingredient are given in the following table which inhibit at least 90% of germination.

+ in the following table shows an at least 90% inhibition of germination effected by the residue of 1 ccm. of a 1% acetone solution of active ingredient, ++ shows the same effect attained by the residue of 1 ccm. of a 0.1% acetone solution of the active ingredient, +++ shows an at least 90% inhibition of germination attained by the residue of 1 ccm. of a 0.01% acetone solution of active ingredient.

SPORE GERMINATION TEST

| Compound | Altern. ten. | Botr. cin. | Clust. c. | Conioth. dipl. | Fusar. culm. | Mucor spec. | Penic. spec. | Stemph. cons. |
|---|---|---|---|---|---|---|---|---|
| O-[3-ethyl-quinolyl-(8)]-N-methyl carbamic acid ester | ++ | ++ | ++ | ++ | + | ++ | + | + |
| O-[5-methyl-quinolyl-(8)]-N-methyl carbamic acid ester | +++ | +++ | ++ | ++ | +++ | ++ | +++ | + |
| O-[5-ethyl-quinolyl-(8)]-N-methyl carbamic acid ester | + | ++ | ++ | ++ | + | ++ | ++ | + |
| O-[5-acetyl-quinolyl-(8)]-N-methyl carbamic acid ester | +++ | +++ | +++ | ++ | +++ | +++ | +++ | ++ |
| O-[5-n-butyryl-quinolyl-(8)]-N-methyl carbamic acid ester | ++ | ++ | ++ | ++ | ++ | ++ | ++ | ++ |
| O-[5-isovaleryl-quinolyl-(8)]-N-methyl carbamic acid ester | ++ | ++ | ++ | ++ | ++ | ++ | ++ | ++ |
| O-[5-benzoyl-quinolyl-(8)]-N-methyl carbamic acid ester | +++ | ++ | ++ | ++ | ++ | ++ | ++ | +++ |
| O-[5-(2',5'-dibromobenzoyl)-(8)]-N-methyl carbamic acid ester | + | ++ | ++ | ++ | + | +++ | ++ | ++ |
| O-[2-methyl-5-acetyl-quinolyl-(8)]-N-methyl carbamic acid ester | ++ | ++ | ++ | ++ | + | + | + | + |
| O-[2-methyl-5-isovaleryl-quinolyl-(8)]-N-methyl carbamic acid ester | + | + | + | + | + | + | + | + |
| O-[5,7-dichloroquinolyl-(8)]-N-methyl carbamic acid ester | +++ | +++ | +++ | + | ++ | ++ | ++ | + |
| O-[5,7-dibromoquinolyl-(8)]-N-methyl carbamic acid ester | ++ | ++ | ++ | ++ | + | + | ++ | + |
| O-[5,7-diiodoquinolyl-(8)]-N-methyl carbamic acid ester | ++ | ++ | ++ | ++ | + | + | ++ | + |
| O-[5-chloro-7-iodoquinolyl-(8)]-N-methyl carbamic acid ester | + | + | ++ | + | ++ | ++ | ++ | ++ |
| O-[4-methyl-quinolyl-(8)]-N-methyl carbamic acid ester | ++ | ++ | ++ | +++ | ++ | ++ | +++ | ++ |
| O-[6-chloroquinolyl-(8)]-N-methyl carbamic acid ester | ++ | ++ | ++ | ++ | ++ | ++ | ++ | ++ |
| O-[2-methyl-5,7-dichloroquinolyl-(8)]-N-methyl carbamic acid ester | ++ | ++ | ++ | ++ | ++ | ++ | ++ | ++ |
| O-[5-thiocyano-quinolyl-(8)-N-methyl carbamic acid ester | ++ | ++ | +++ | ++ | ++ | ++ | ++ | ++ |
| O-[6-nitroquinolyl-(8)]-N-methyl carbamic acid ester | +++ | +++ | ++ | ++ | +++ | +++ | ++ | ++ |

B. SEED DRESSING TEST

A 20% pulverulent seed dressing is produced by mixing 20 parts of the active substance to be tested with 80 parts of talcum or by impregnating 80 parts of talcum with the acetone solution of 20 parts of active substance.

Fusarium culmorum test

Grains of rye are inoculated with Fusarium spores. 5 g. of these grains are weighed and dusted with 10 mg. of the seed dressing described above.

The grains are then spread out on a filter paper and a control is made after 3, 4, 5, 6, 7 and 10 days. The percentual activity is added and divided by the number of controls made.

Tilletia tritici test

Grains of wheat are inoculated with Tilletia spores. 5 g. of these grains are then dusted with 10 mg. of the above seed dressing. The treated wheat grains are set in earth containing no fungi. The germinated grains are removed after 5 days. After another 5 days the earth is tested for fungi and growth thereof which have been carried by the infected wheat grains.

The action is estimated visually and is given in percentages.

SEED DRESSING (CONCENTRATION 20%)

| Compound | Percent action against— | |
|---|---|---|
| | Fusarium cul. | Tilletia tritici |
| O-[6-nitro-quinolyl-(8)]-N-methyl carbamic acid ester | 33 | |
| O-[5,7-dichloroquinolyl-(8)]-N-methyl carbamic acid ester | 59 | 100 |
| O-[5,7-dibromoquinolyl-(8)]-N-methyl carbamic acid ester | 69 | 100 |
| O-[5-chloro-7-iodoquinolyl-(8)]-N-methyl carbamic acid ester | 72 | 100 |
| O-[5-isovaleryl-quinolyl-(8)]-N-methyl carbamic acid ester | 75 | 90 |
| O-[5-benzoyl-quinolyl-(8)]-N-methyl carbamic acid ester | 53 | 50 |
| O-[5-o-chlorobenzoyl-quinolyl-(8)]-N-methyl carbamic acid ester | 83 | 90 |
| O-[2-methyl-5,7-dichloroquinolyl-(8)]-N-methyl carbamic acid ester | 53 | 80 |
| O-[2-methyl-5-acetyl-quinolyl-(8)]-N-methyl carbamic acid ester | 50 | 100 |

What is claimed is:

1. A compound of the formula:

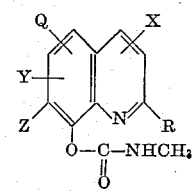

wherein

R is a member selected from the group consisting of hydrogen and methyl,

X is a member selected from the group consisting of hydrogen and lower alkyl,

Y is a member selected from the group consisting of hydrogen, lower alkyl, lower alkoxy, alkanoyl of from 2 to 12 carbon atoms, benzoyl, chlorobenzoyl, bromobenzoyl, chlorine, bromine, fluorine, iodine, nitro, thiocyano, cyano and amino, Z is a member selected from the group consisting of hydrogen, chlorine, bromine, fluorine, iodine, methyl, ethyl, allyl, benzyl, chlorobenzyl and bromobenzyl, and Q is a member selected from the group consisting of hydrogen, chlorine and bromine.

2. A compound as claimed in claim 1 which is O-[5-methylquinolyl-(8)]-N-methyl carbamic acid ester.

3. A compound as claimed in claim 1 which is O-[5-acetylquinolyl-(8)]-N-methyl carbamic acid ester.

4. A compound as claimed in claim 1 which is O-[5-benzoylquinolyl-(8)]-N-methyl carbamic acid ester.

5. A compound as claimed in claim 1 which is O-[5,7-dichloroquinolyl-(8)]-N-methyl carbamic acid ester.

6. A compound as claimed in claim 1 which is O-[4-methylquinolyl-(8)]-N-methyl carbamic acid ester.

7. A compound as claimed in claim 1 which is O-[6-nitroquinolyl-(8)]-N-methyl carbamic acid ester.

8. A compound as claimed in claim 1 which is O-[2-methylquinolyl-(8)]-N-methyl carbamic acid ester.

9. The non-phytotoxic addition salts of the compound of claim 1 with an acid.

References Cited

UNITED STATES PATENTS

| | | | |
|---|---|---|---|
| 2,681,879 | 8/1949 | Gysin et al. | 167—33 |
| 2,749,347 | 6/1956 | Kreysa | 260—287 |
| 3,005,823 | 10/1961 | Kaeding | 260—287 |

OTHER REFERENCES

Frear: "Chemistry of the Pesticides," Van Nostrand, 3rd ed., p. 301 (1955).

Horsfall: "Fungicides," Chronica Botanica, p. 135 and p. 151 (1945).

ALEX MAZEL, *Primary Examiner.*

DONALD G. DAUS, *Assistant Examiner.*